US008610923B2

(12) United States Patent
Takeshita

(10) Patent No.: US 8,610,923 B2
(45) Date of Patent: Dec. 17, 2013

(54) INFORMATION FORMING APPARATUS FOR DETERMINING WHETHER TO ACCEPT A SETTING CHANGE REQUEST FROM ANOTHER DEVICE

(75) Inventor: Yoshihiro Takeshita, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1146 days.

(21) Appl. No.: 12/548,138

(22) Filed: Aug. 26, 2009

(65) Prior Publication Data
US 2010/0097641 A1    Apr. 22, 2010

(30) Foreign Application Priority Data

Oct. 21, 2008 (JP) ................................ 2008-270851

(51) Int. Cl.
*G06F 3/12*    (2006.01)
(52) U.S. Cl.
USPC .......... 358/1.15; 358/1.13; 358/1.16; 726/26; 726/27; 726/28; 726/29; 726/30
(58) Field of Classification Search
USPC ...................................... 358/1.15; 726/26–30
See application file for complete search history.

(56) References Cited

U.S. PATENT DOCUMENTS

| 7,218,976 | B2 * | 5/2007 | Minagawa | 700/67 |
| 8,014,013 | B2 * | 9/2011 | Owen et al. | 358/1.15 |
| 2003/0167361 | A1 * | 9/2003 | Beard et al. | 710/8 |
| 2005/0108549 | A1 * | 5/2005 | Kanai | 713/182 |
| 2006/0044607 | A1 * | 3/2006 | Kato | 358/1.15 |
| 2006/0064597 | A1 * | 3/2006 | Hatano | 713/179 |
| 2006/0274370 | A1 * | 12/2006 | Shima | 358/1.15 |
| 2006/0279780 | A1 * | 12/2006 | Anno et al. | 358/1.15 |
| 2008/0120506 | A1 * | 5/2008 | Yamauchi et al. | 713/176 |
| 2008/0297829 | A1 * | 12/2008 | Paek | 358/1.15 |
| 2009/0300713 | A1 * | 12/2009 | Sakai | 726/1 |

FOREIGN PATENT DOCUMENTS

JP    B2-3697176    9/2005

* cited by examiner

*Primary Examiner* — Benjamin O Dulaney
(74) *Attorney, Agent, or Firm* — Oliff & Berridge, PLC

(57) ABSTRACT

An information processing apparatus includes: a first change unit that changes a setting content of a provided function based on a setting change request received from an external device; a second change unit that changes a setting content of a provided function based on a setting change request inputted from an operation part of the apparatus; a storage unit that, when a setting content of a function is to be changed, stores necessary/unnecessary information indicating presence/absence of necessity not to receive a setting change request from a device other than the external device or the operation part of the apparatus to change the setting content, by each function; a determination unit that, when the first and second change units are to change a setting content of a function, determines whether or not exclusive processing not to receive a setting change request from the other device is necessary, based on the necessary/unnecessary information stored in the storage unit; and a controller that, when the determination unit determines that the exclusive processing is necessary, controls the first and second change units not to receive a setting change request from the other device.

9 Claims, 15 Drawing Sheets

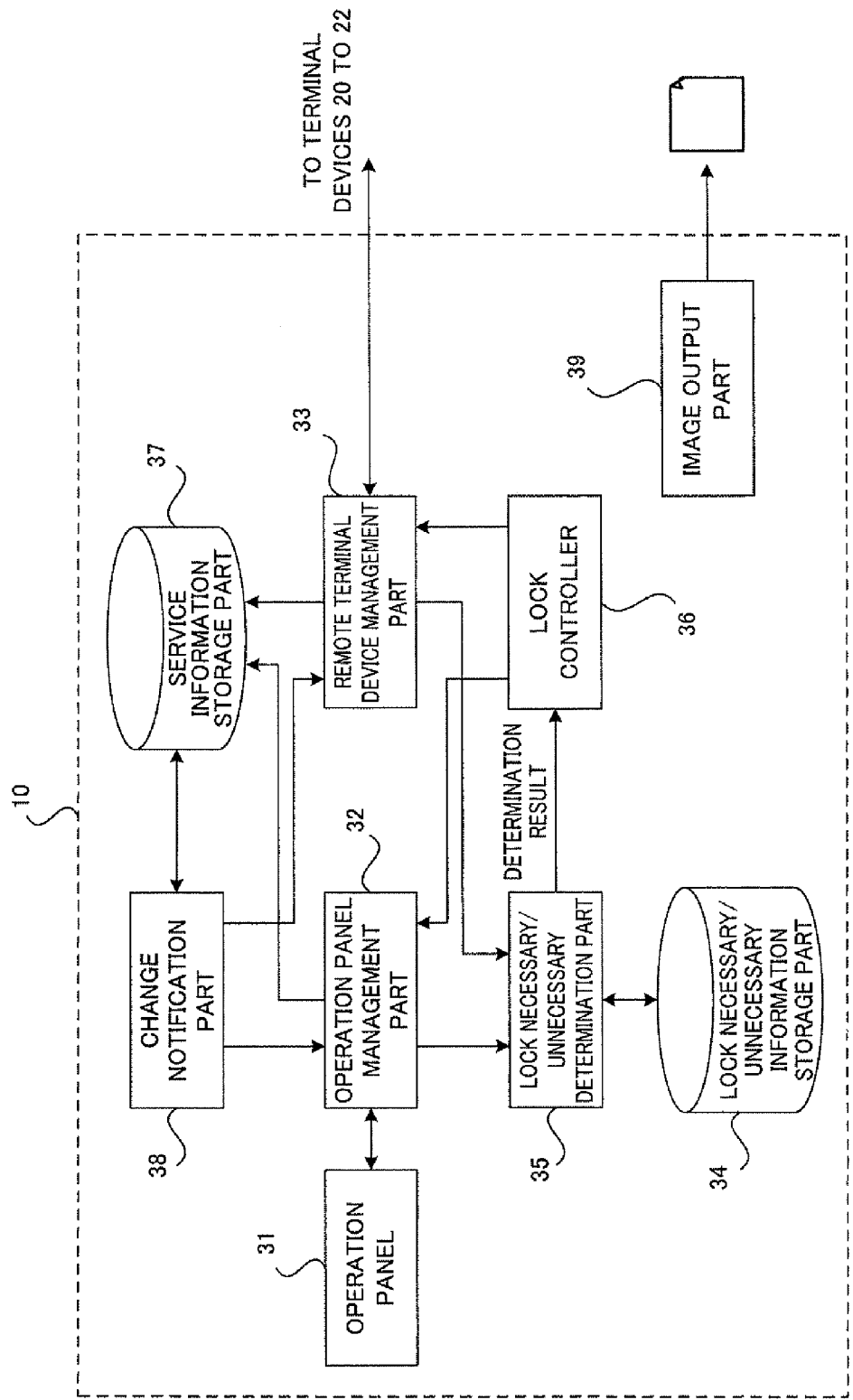

FIG. 4

INSTRUCTION SERVICE

| REGISTRATION | LOCK UNNECESSARY |
|---|---|
| CORRECTION | LOCK NECESSARY (ONLY IN EXECUTION) |
| DELETION | LOCK NECESSARY (ONLY IN EXECUTION) |
| EXECUTION | LOCK UNNECESSARY |

CUSTOM SERVICE

| REGISTRATION | LOCK UNNECESSARY |
|---|---|
| CORRECTION | LOCK UNNECESSARY |
| DELETION | LOCK UNNECESSARY |
| EXECUTION | LOCK UNNECESSARY |

DESTINATION LIST SERVICE

| REGISTRATION | LOCK NECESSARY |
|---|---|
| CORRECTION | LOCK NECESSARY |
| DELETION | LOCK NECESSARY |
| EXECUTION | LOCK NECESSARY |

FIG. 7

|  |  | SETTING CHANGE FROM TERMINAL DEVICE 20 ||
|  |  | LOCK INSTRUCTION | NO LOCK INSTRUCTION |
| --- | --- | --- | --- |
| SETTINGS OF IMAGE FORMING APPARATUS 10 | LOCK NECESSARY | EXECUTE LOCK PROCESSING | ERROR DISPLAY |
|  | LOCK UNNECESSARY | EXECUTE LOCK PROCESSING | EXECUTE SETTING CHANGE WITHOUT LOCKING |

# INFORMATION FORMING APPARATUS FOR DETERMINING WHETHER TO ACCEPT A SETTING CHANGE REQUEST FROM ANOTHER DEVICE

CROSS-REFERENCE TO RELATED APPLICATIONS

This application is based on and claims priority under 35 USC 119 from Japanese Patent Application No. 2008-270851 filed Oct. 21, 2008.

BACKGROUND

Technical Field

The present invention relates to an information processing apparatus, an image forming apparatus, a terminal device, a user interface control method, a setting change request transmission method and computer readable media storing program.

SUMMARY

According to an aspect of the invention, there is provided an information processing apparatus including: a first change unit that changes a setting content of a provided function based on a setting change request received from an external device; a second change unit that changes a setting content of a provided function based on a setting change request inputted from an operation part of the apparatus; a storage unit that, when a setting content of a function is to be changed, stores necessary/unnecessary information indicating presence/absence of necessity not to receive a setting change request from a device other than the external device or the operation part of the apparatus to change the setting content, by each function; a determination unit that, when the first and second change units are to change a setting content of a function, determines whether or not exclusive processing not to receive a setting change request from the other device is necessary, based on the necessary/unnecessary information stored in the storage unit; and a controller that, when the determination unit determines that the exclusive processing is necessary, controls the first and second change units not to receive a setting change request from the other device.

BRIEF DESCRIPTION OF THE DRAWINGS

An exemplary embodiment of the present invention will be described in detail based on the following figures, wherein:

FIG. 3 is a block diagram showing a functional configuration of the image forming apparatus 10 in the exemplary embodiment of the present invention;

FIG. 4 illustrates an example of lock necessary/unnecessary information stored in a lock necessary/unnecessary information storage part 34;

FIG. 7 is a table showing relation between presence/absence of lock instruction included in the setting change request and the lock necessary/unnecessary information when the setting change request is transmitted from the terminal device 20;

DETAILED DESCRIPTION

Figure 1:
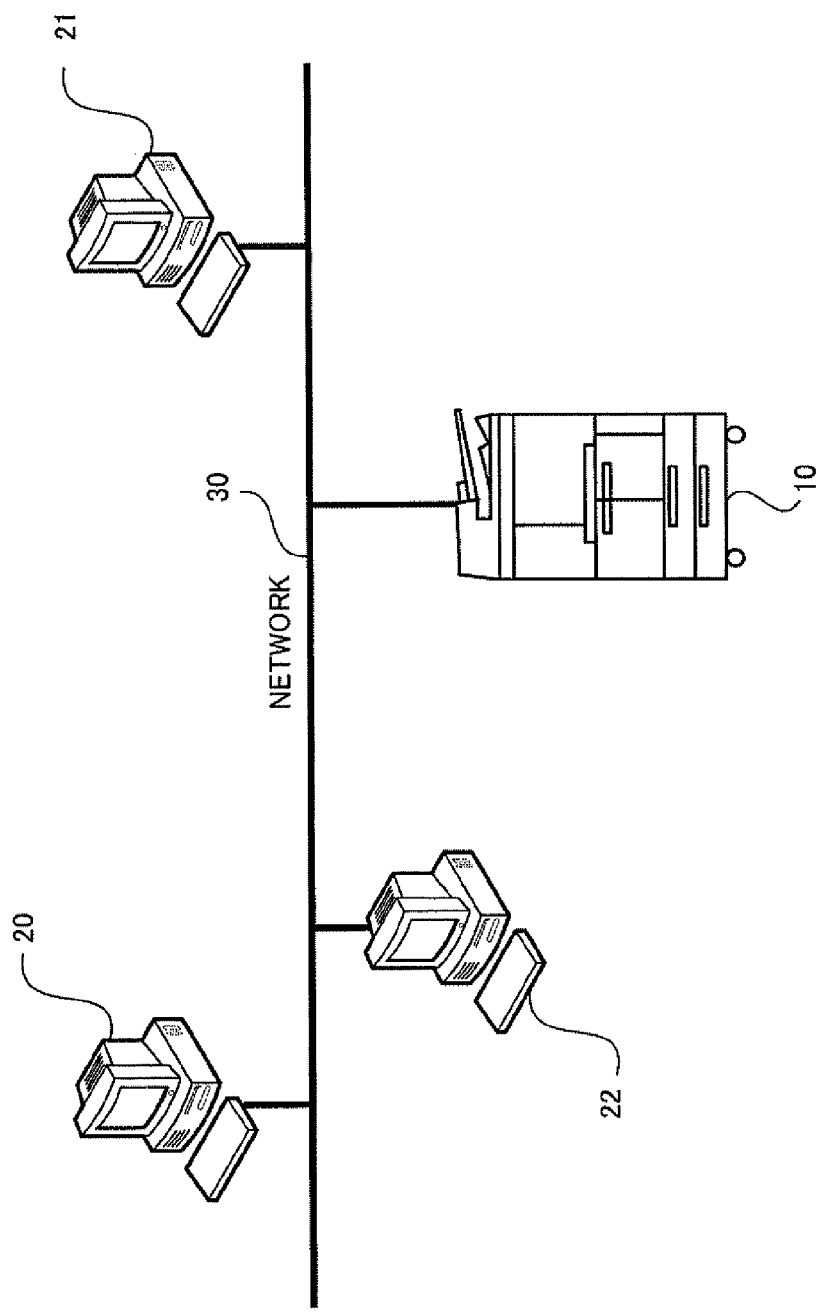
FIG. 1 is a block diagram showing a configuration of an image forming system according to an exemplary embodiment of the present invention.

Next, an exemplary embodiment of the present invention will be described based on the drawings. FIG. 1 is a block diagram showing a configuration of an image forming system according to the exemplary embodiment of the present invention.

As shown in FIG. 1, the image forming system according to the exemplary embodiment of the present invention has an image forming apparatus 10 and plural terminal devices 20 to 22 interconnected via a network 30. The terminal devices 20 to 22 generate print data, and transmit the generated print data via the network 30 to the image forming apparatus 10. The image forming apparatus 10 receives the print data transmitted from the terminal devices 20 to 22 and outputs an image corresponding to the print data on paper. Note that the image forming apparatus 10 is a so-called multifunction apparatus having plural functions such as a print function, a scan function, a duplication (copying) function and a facsimile function.

Figure 2:
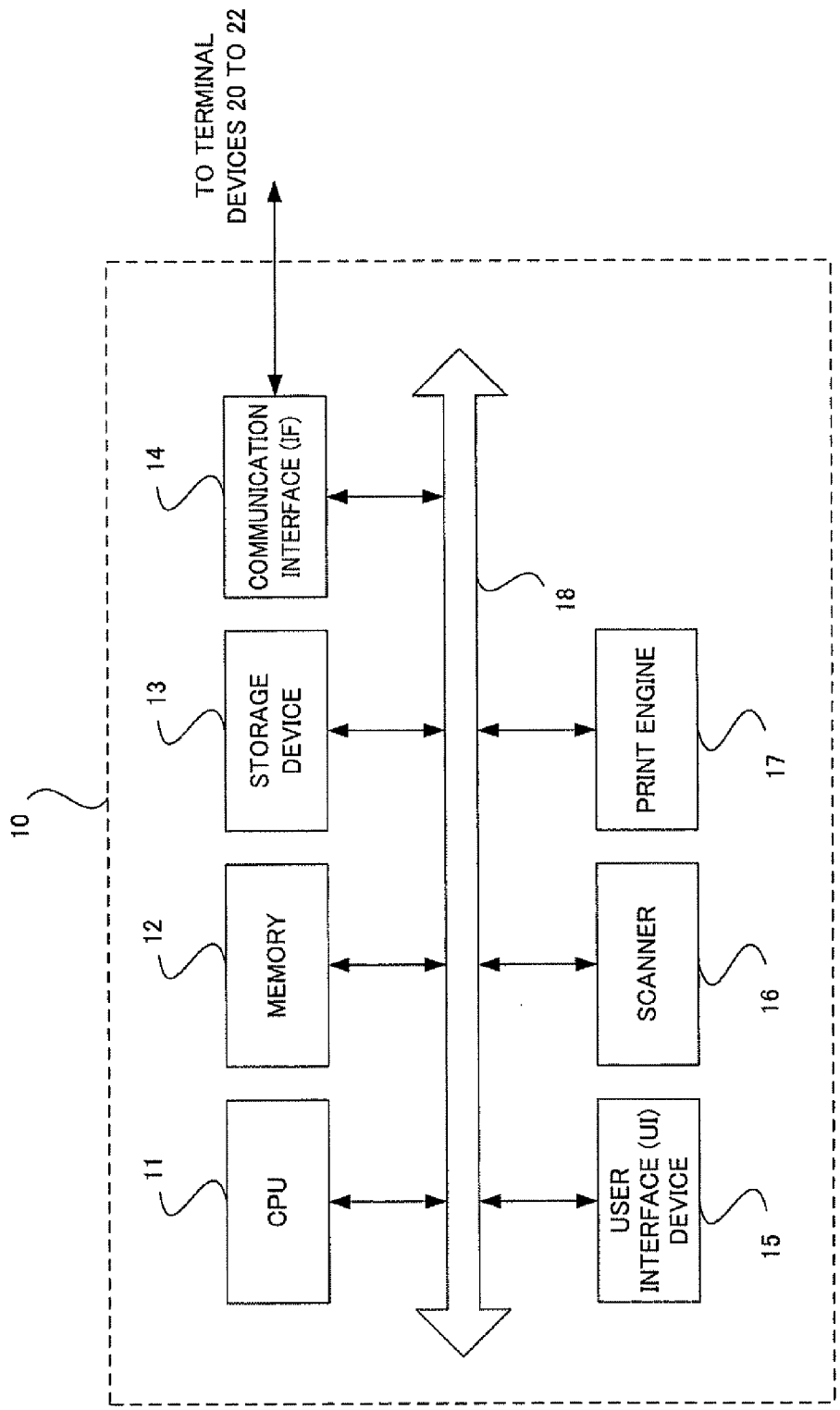
FIG. 2 is a block diagram showing a hardware configuration of an image forming apparatus 10 in the exemplary embodiment of the present invention.

Next, FIG. 2 shows a hardware configuration of the image forming apparatus 10 in the image forming system in the present exemplary embodiment.

As shown in FIG. 2, the image forming apparatus 10 has a CPU 11, a memory 12, a storage device 13 such as a hard disk drive (HDD), a communication interface (IF) 14 to perform data transmission/reception via the network 30 to/from an external device or the like, a user interface (UI) device 15 including a touch panel or a liquid crystal panel and a keyboard, a scanner 16, and a print engine 17. These constituent elements are interconnected via a control bus 18.

The CPU 11 performs predetermined processing based on a control program stored in the memory 12 or the storage device 13, to control the operation of the image forming apparatus 10. Note that in the present exemplary embodiment, the CPU 11 reads the control program stored in the memory 12 or the storage device 13 and executes the program; however, it may be arranged such that the program is stored on a storage medium such as a CD-ROM and provided to the CPU 11.

FIG. 3 is a block diagram showing a functional configuration of the image forming apparatus 10 realized by execution of the above-described control program.

As shown in FIG. 3, the image forming apparatus 10 in the present exemplary embodiment has an operation panel 31, an operation panel management part 32, a remote terminal device management part 33, a lock necessary/unnecessary information storage part 34, a lock necessary/unnecessary determination part 35, a lock controller 36, a service information storage part 37, a change notification part 38 and an image output part 39.

The operation panel 31 is an operation part having ten keys, a touch panel and various keys, and has a function of changing setting contents of various service functions provided from the image forming apparatus 10. The operation panel management part 32 changes the setting contents of provided service functions based on a setting change request inputted from the operation panel 31.

The remote terminal device management part 33 changes the setting contents of the provided service functions based on a setting change request received from the terminal devices 20 to 22 as external devices.

Note that the terminal devices 20 to 22 in the present exemplary embodiment have a function of generating a setting change request including an instruction to reject a setting change request from another device and change setting contents or change the setting contents without rejection, and transmitting the generated setting change request to the image forming apparatus 10.

Further, the remote terminal device management part 33 has a function of, when a setting change request including an instruction to change setting contents without rejecting a setting change request from another device is received from the terminal devices 20 to 22 and when the lock necessary/unnecessary determination part 35 determines that lock processing (exclusive processing) is necessary, transmitting a notification indicating that the lock processing is necessary to the terminal device that transmitted the setting change request.

When the setting contents of some service function are to be changed, the lock necessary/unnecessary information storage part 34 stores necessary/unnecessary information indicating presence/absence of necessity not to receive a setting change request from a device other than the terminal device or the operation panel 31 as an operation part of the apparatus to change the setting contents, by each service function.

FIG. 4 illustrates an example of the lock necessary/unnecessary information stored in the lock necessary/unnecessary information storage part 34.

In the example shown in FIG. 4, the lock necessary/unnecessary information is set regarding an instruction service, a custom service and a destination list service. Note that the "instruction service" previously registers plural steps of desired processing and the order of execution as instructions, selecting one instruction from the plural registered instructions and executing the selected instruction, thereby executing processing based on the instruction. Further, the "custom service" enables each user to customize a screen displayed on the operation panel 31. Further, the "destination list service" previously registers destination data for facsimile transmission and in facsimile transmission, performs transmission using the registered destination data.

In the example shown in FIG. 4, regarding the instruction service, the lock processing is unnecessary for execution of registering and execution processing, however, the lock processing is necessary for execution of correction and deletion processing. When the contents of an instruction are corrected or deleted in execution of the instruction service, mismatching may occur in the executed processing or processing based on the instruction cannot be executed in the middle. Note that regarding the correction and deletion processing, the lock processing is necessary only when the instruction is in execution. That is, regarding registration and execution of an instruction, it is not necessary to lock an operation from another device; however, regarding an instruction in execution, the lock processing is necessary to prevent correction and deletion. In this manner, the necessary/unnecessary information to determine whether the lock processing is necessary or unnecessary regardless of whether or not a service function is in execution, will be referred to as static information. Further, the necessary/unnecessary information to determine whether the lock is necessary or unnecessary based on whether or not a service function is in execution, will be referred to as dynamic information.

Further, regarding the custom service, the lock processing is unnecessary regarding all the registration, correction, deletion and execution processing. In the custom service, when processing is performed after the startup of the image forming apparatus 10, a display screen on the operation panel 31 is determined, and thereafter, even when the setting contents are changed, mismatching does not occur in the service function. Further, regarding the destination list service, the lock processing is necessary regarding all the registration, correction, deletion and execution processing. As destination information registered in the destination list service is used in other service functions, mismatching may occur when the other service function is changed during change of the destination information in the destination list service.

In this example, for the sake of simplicity of explanation, the lock necessary/unnecessary information is shown only regarding the instruction service, the custom service and the destination list service; however, the lock necessary/unnecessary information is respectively set regarding other services. For example, the lock necessary/unnecessary information is respectively set for a user management service to manage a password, an ID and the like of each user, an account management service to manage an upper limit value of prints by each user, information on the number of prints by present time by each user, a confidential box function to designate a location for storage of scanned image data, and the like.

When the operation panel management part 32 and the remote terminal device management part 33 are to change setting contents of various service functions, the lock necessary/unnecessary determination part 35 determines whether or not the lock processing (exclusive processing) not to receive a setting change request from another device is necessary, based on the lock necessary/unnecessary information stored in the lock necessary/unnecessary information storage part 34.

When the lock necessary/unnecessary determination part 35 determines that the lock processing is necessary, the lock controller 36 controls the operation panel management part 32 and the remote terminal device management part 33 not to receive a setting change request from another device.

When the remote terminal device management part 33 receives, from the terminal device, a setting change request, including an instruction to change setting contents while rejecting a setting change request from another device, the lock controller 36 controls the operation panel management part 32 and the remote terminal device management part 33 not to receive a setting change request from another device regardless of the result of determination by the lock necessary/unnecessary determination part 35.

When the operation panel management part 32 receives a setting change request from the operation panel 31 and the lock necessary/unnecessary determination part 35 determines that the lock processing is unnecessary, the lock controller 36 controls the operation panel management part 32 and the remote terminal device management part 33 to receive a setting change request from another device.

When the remote terminal device management part 33 receives, from the terminal device, a setting change request, including an instruction to change setting contents without rejecting a setting change request from another device and the lock necessary/unnecessary determination part 35 determines that the lock processing is unnecessary, the lock controller 36 controls the operation panel management part 32 and the remote terminal device management part 33 to perform setting change without controlling these parts not to receive a setting change request from another device.

The service information storage part 37 holds information on setting contents of the various service functions provided from the image forming apparatus 10. The operation panel management part 32 and the remote terminal device management part 33 change the setting contents of the various service functions by changing the information stored in the service information storage part 37 based on a setting change request received from the operation panel 31 or the terminal devices 20 to 22.

When the terminal devices 20 to 22 or the operation panel 31 changes setting contents of a previously-set service function, the change notification part 38 notifies the other device of the change of setting contents of the service functions. For example, when the terminal device 20 changes setting contents of a certain service function, the change notification part 38 notifies the terminal devices 21 and 22 or the operation panel 31 of the change.

The image output part 39 outputs an image based on image data designated from the terminal devices 20 to 22 or the operation panel 31.

When the image forming apparatus 10 in the present exemplary embodiment, having the above-described configuration, receives a setting change request from the terminal devices 20 to 22 or a setting change request inputted from the operation panel 31 and changes setting contents of the provided service function based on the received setting change request, it is determined whether or not the lock processing not to receive a setting change request from a device other than the terminal devices 20 to 22 or the operation panel 31 which has transmitted the change request is necessary. Then when it is determined that the lock processing is necessary, the image forming apparatus 10 performs the lock processing not to receive a setting change request from the other device, and changes the setting contents based on the setting change request received from the terminal devices 20 to 22 or the operation panel 31.

Next, the operations of the image forming apparatus 10 in the present exemplary embodiment will be described in detail with reference to the drawings.

Figure 5:
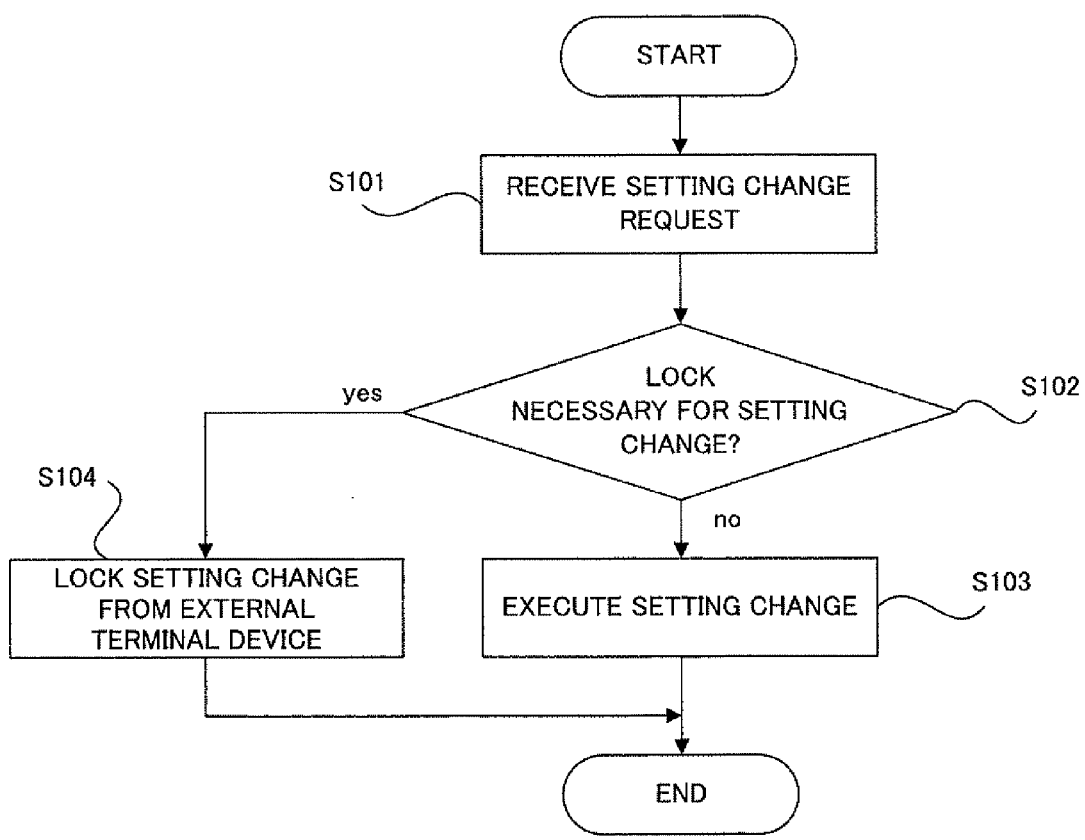
FIG. 5 is a flowchart showing an operation of the image forming apparatus 10 in the exemplary embodiment of the present invention when a setting change request is inputted from an operation panel 31.

First, FIG. 5 is a flowchart showing the operation of the image forming apparatus 10 upon input of a setting change request from the operation panel 31.

When a setting change request is inputted from the operation panel 31, the setting change request is received by the operation panel management part 32 (step S101). Then, the lock necessary/unnecessary determination part 35 determines whether or not the lock processing is necessary to prevent occurrence of mismatching in execution of this setting change request (step S102).

When it is determined at step S102 that the lock processing is necessary (Yes at step S102), the lock controller 36 controls the remote terminal device management part 33 not to receive but to reject a setting change request from the external terminal devices 20 to 22 (step S104).

When it is determined at step S102 that the lock processing is unnecessary (No at step S102), the lock controller 36 does not lock the remote terminal device management part 33 so as to receive a setting change request from the external terminal devices 20 to 22. Then, in the state where the remote terminal device management part 33 is not locked, the operation panel management part 32 performs setting change based on the setting change request inputted from the operation panel 31 (step S104).

Figure 6:
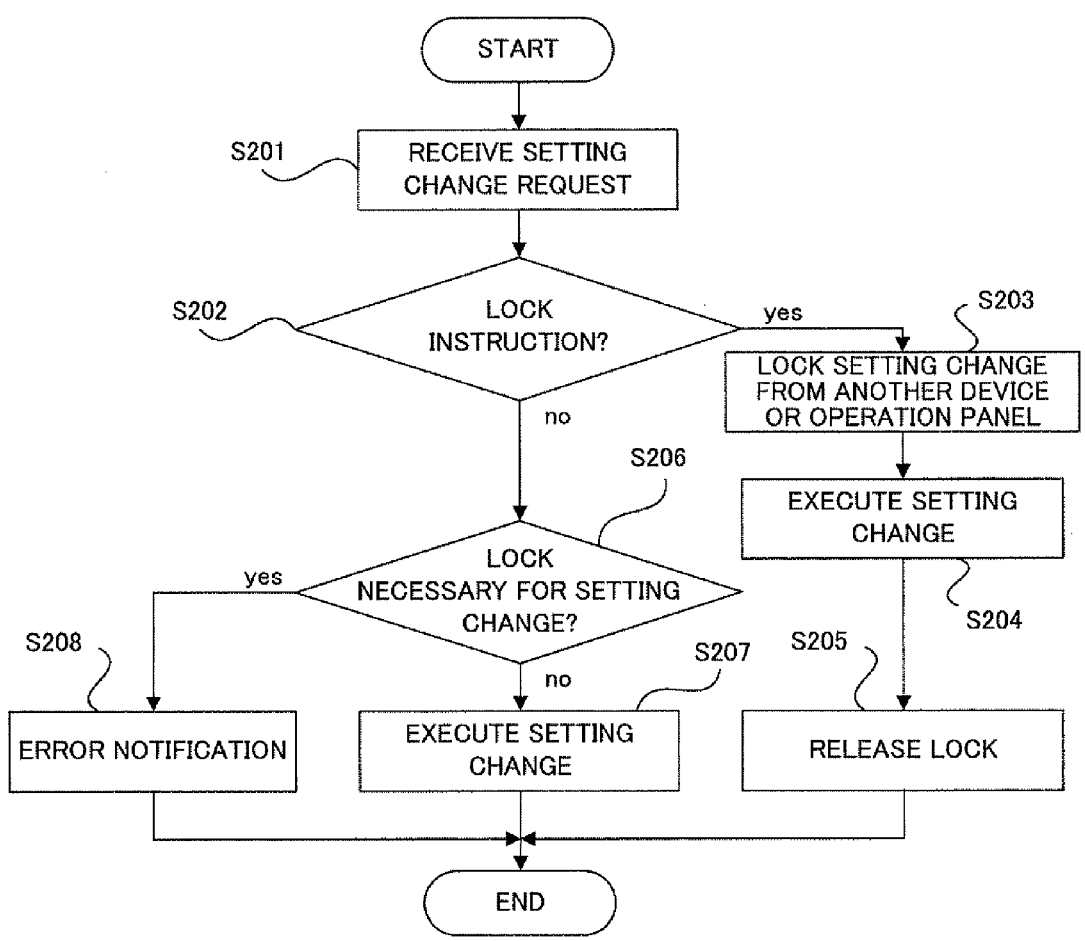
FIG. 6 is a flowchart showing an operation of the image forming apparatus 10 in the exemplary embodiment of the present invention when a setting change request is transmitted from a terminal device 20.

Next, FIG. 6 is a flowchart showing the operation of the image forming apparatus 10 when a setting change request is transmitted from the terminal device 20.

Note that in the following description, the setting change request is transmitted from the terminal device 20 to the image forming apparatus 10; however, even when the setting change request is transmitted from the terminal devices 21 or 22, the image forming apparatus 10 performs a similar operation.

When the setting change request is inputted from the terminal device 20, the setting change request is received by the remote terminal device management part 33 (step S201).

Then, it is determined whether the setting change request includes an instruction to change setting contents while rejecting a setting change request from another device (presence of lock instruction) or an instruction to change setting contents without rejection (absence of lock instruction) (step S202).

When it is determined at step S202 that the setting change request from the terminal device 20 includes an instruction to change setting contents while rejecting a setting change request from another device (lock instruction) (Yes at step S202), the lock controller 36 locks the operation panel management part 32 and the remote terminal device management part 33 not to receive a setting change request from the other terminal devices 21 and 22 and the operation panel 31 (step S203). Then, in this state, the remote terminal device management part 33 performs setting change to change setting contents of the service function stored in the service information storage part 37 based on the setting change request from the terminal device 20 (step S204).

When the setting change has been completed, the lock controller 36 releases the lock state of the operation panel management part 32 and the remote terminal device management part 33, and terminates the processing (step S205).

When it is determined at step S202 that the setting change request from the terminal device 20 includes an instruction to change setting contents without rejecting a setting change request from another device (absence of lock instruction) (No at step S202), the lock necessary/unnecessary determination part 35 determines necessity or unnecessity of the lock processing based on the lock necessary/unnecessary information stored in the lock necessary/unnecessary information storage part 34 (step S206).

When it is determined at step S206 that the lock processing is unnecessary (No at step S206), the lock controller 36 does not perform the lock processing and the remote terminal device management part 33 performs setting change based on the received setting change request (step S207).

When it is determined at step S206 that the lock processing is necessary (Yes at step S206), the remote terminal device management part 33 transmits an error notification indicating that the lock processing is necessary to perform the received setting change request, to the terminal device 20 (step S208).

The relation between the presence/absence of lock instruction included in the setting change request transmitted from the terminal device 20 and the lock necessary/unnecessary information, described in the flowchart of FIG. 6, will be described with reference to FIG. 7.

In FIG. 7, it is understood that when the setting change request from the terminal device 20 includes a lock instruction, the lock processing is performed regardless of the lock necessary/unnecessary information previously stored in the image forming apparatus 10. Then, when the setting change request from the terminal device 20 does not include a lock instruction, the processing differs in accordance with setting as to whether the lock processing is necessary or unnecessary upon change of setting contents of a designated service function in the lock necessary/unnecessary information. In this case, when setting for a case where the lock processing is necessary is made in the lock necessary/unnecessary information, since a contradiction occurs with respect to the absence of the lock instruction included in the setting change request from the terminal device 20, the remote terminal device management part 33 transmits an error notification to the terminal device 20. On the other hand, when setting for a case where the lock processing is unnecessary is made in the lock necessary/unnecessary information, since the setting corresponds to the absence of the lock instruction included in the setting change request from the terminal device 20, the lock controller 36 does not perform the lock processing on the operation panel management part 32 and the remote terminal device management part 33. Therefore, the remote terminal device management part 33 changes the information on the service function stored in the service information storage part 37 without performing the lock processing.

Figure 8:
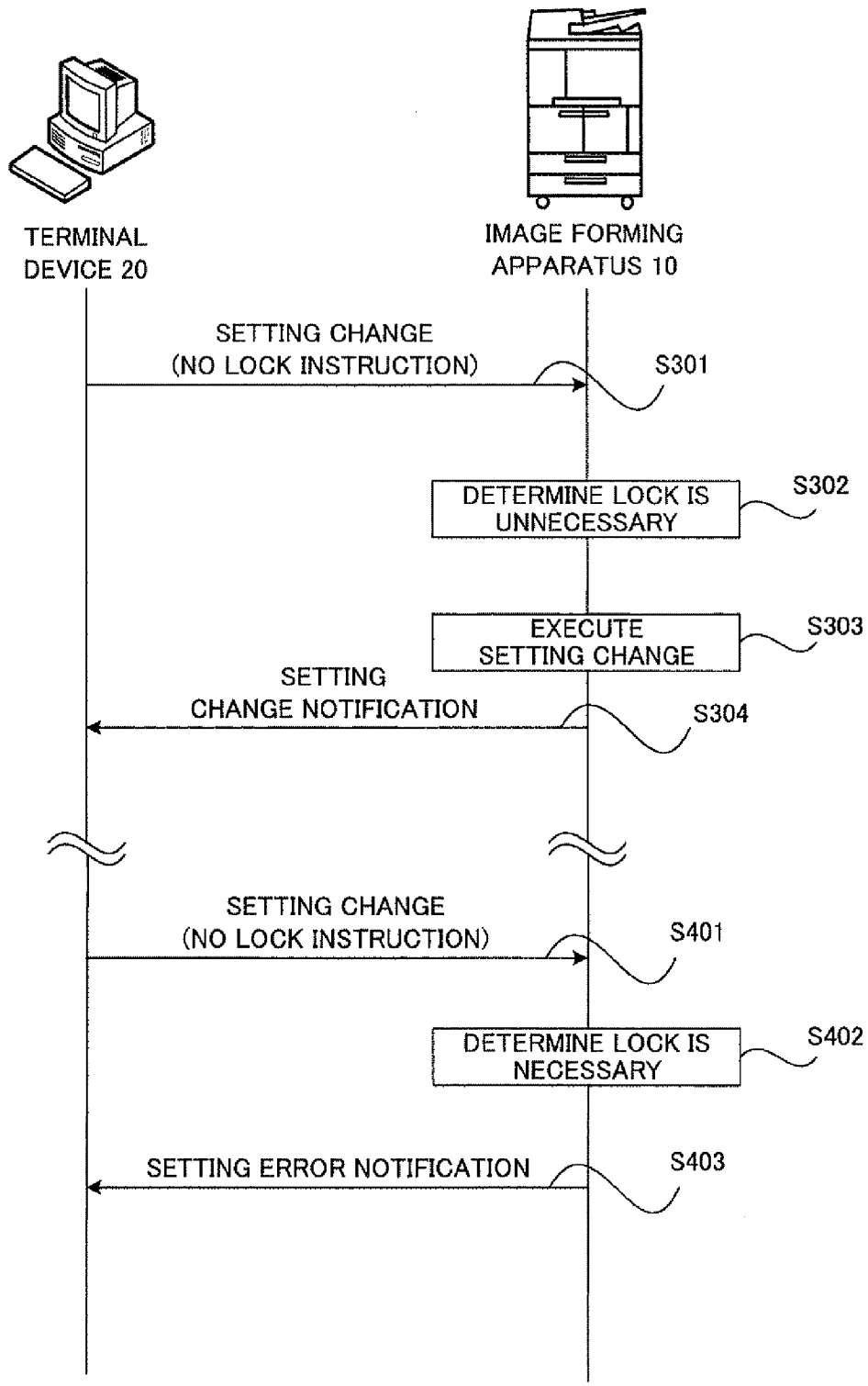
FIG. 8 is a sequence chart showing an example of an operation performed between the image forming apparatus 10 and the terminal device 20.

Next, an example of the operation performed between the image forming apparatus 10 and the terminal device 20 will be described with reference to the sequence chart of FIG. 8.

When the terminal device 20 transmits a setting change request not including a lock instruction to the image forming apparatus 10 (step S301) and it is determined that the lock processing is unnecessary in the image forming apparatus 10 (step S302), setting change is performed in the image forming apparatus 10 in a state where the lock processing is not performed (step S303). Then, when the setting change has been completed, a setting change completion notification is transmitted from the image forming apparatus 10 to the terminal device 20 (step S304).

Figure 9:
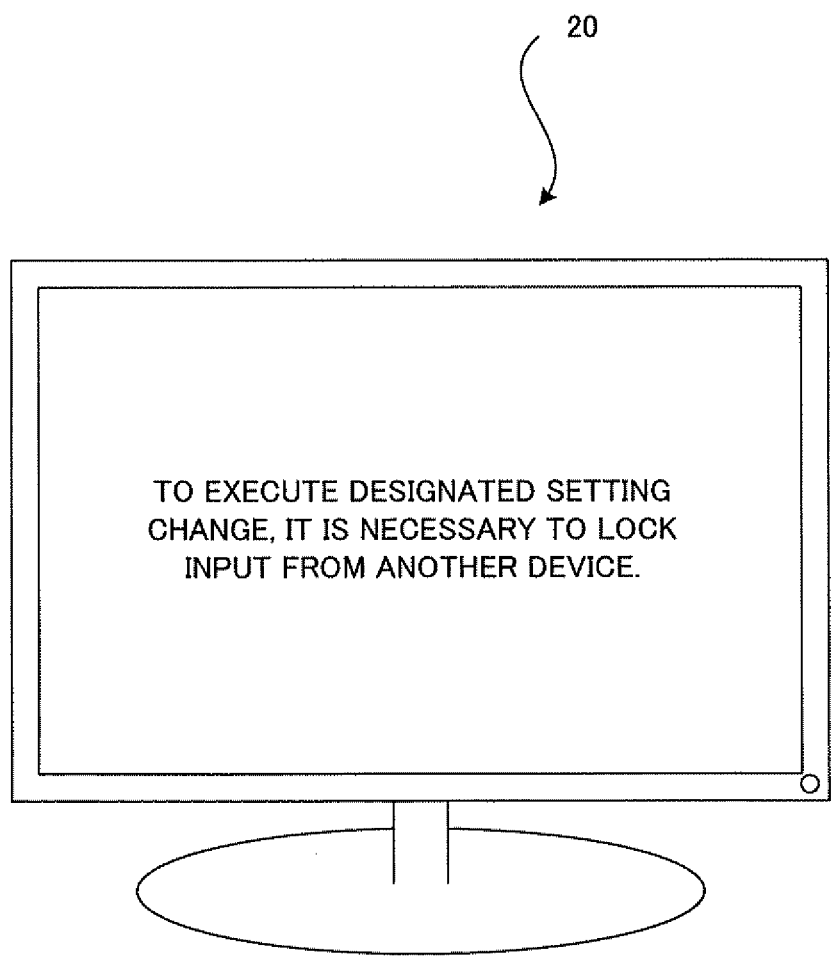
FIG. 9 illustrates an example of setting error notification displayed on the terminal device 20.

Further, when the terminal device 20 transmits a setting change request not including a lock instruction to the image forming apparatus 10 (step S401) and it is determined that the lock processing is necessary in the image forming apparatus 10 (step S402), an error notification indicating that the lock processing is necessary to change setting contents of a designated service function is transmitted from the image forming apparatus 10 (step S403). FIG. 9 shows a display example of this error notification on the terminal device 20. In the display example shown in FIG. 9, a message "To execute designated setting change, it is necessary to lock input from another device." is displayed on the display screen of the terminal device 20, and the user grasps that a lock instruction is necessary.

Figure 10:
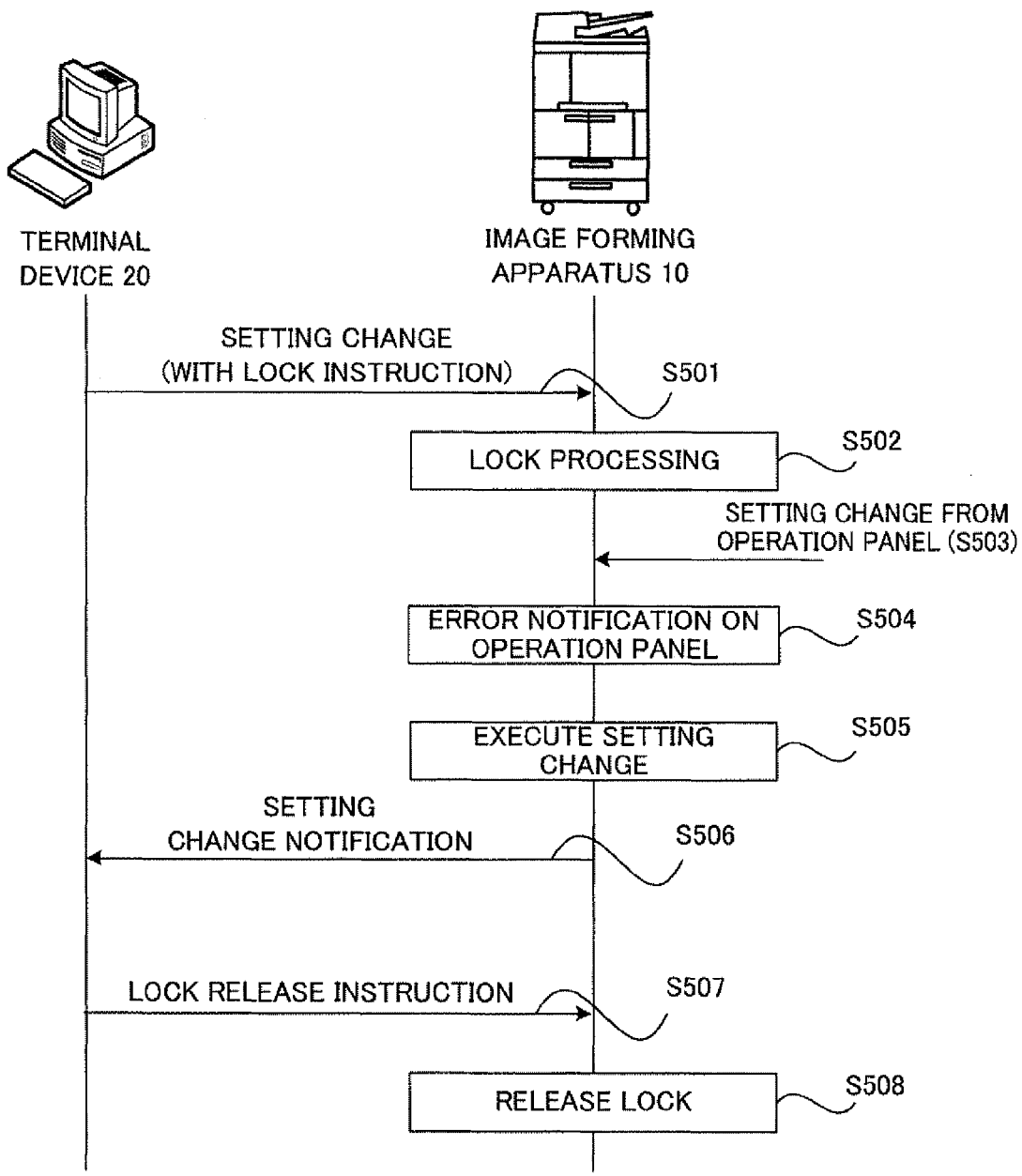
FIG. 10 is a sequence chart showing another example of the operation performed between the image forming apparatus 10 and the terminal device 20.

Further, another example of the operation performed between the image forming apparatus 10 and the terminal device 20 will be described with reference to the sequence chart of FIG. 10.

When the terminal device 20 transmits a setting change request including a lock instruction to the image forming apparatus 10 (step S501), the lock processing is performed regardless of the lock necessary/unnecessary information in the image forming apparatus 10 (step S502). Accordingly, in the state where the lock processing is performed, when a setting change request is inputted from the operation panel 31 (step S503), an error notification as shown in FIG. 11 is displayed on the operation panel 31 (step S504).

Figure 11:
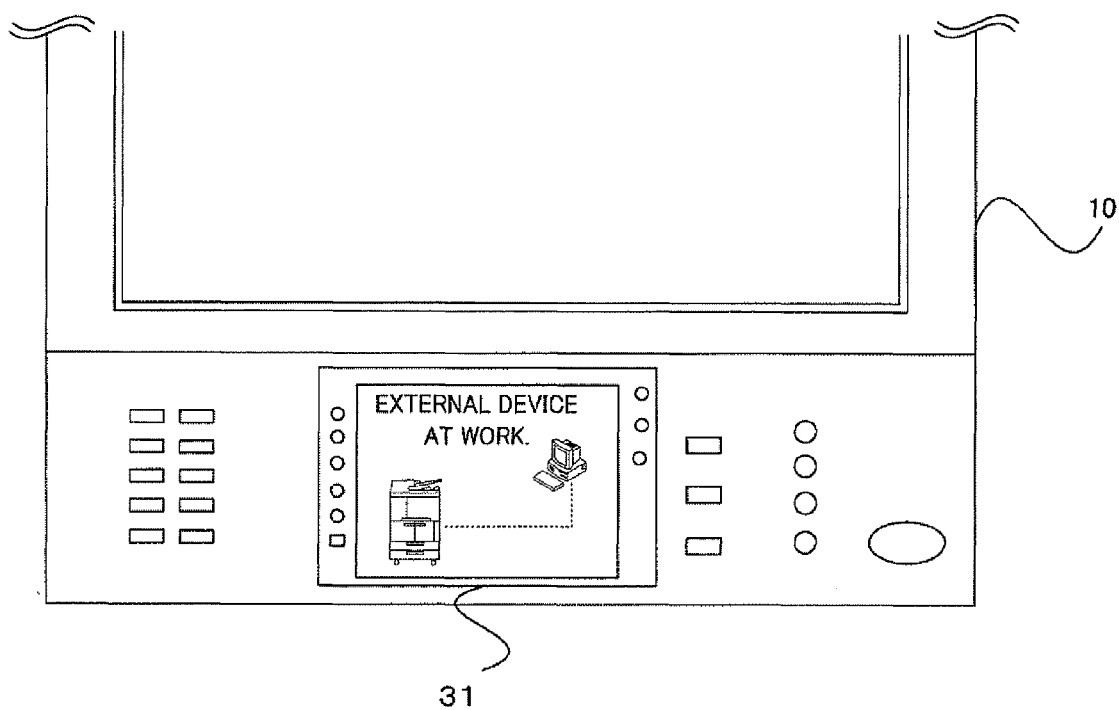
FIG. 11 illustrates an example of error notification displayed on the operation panel 31 of the image forming apparatus 10.

The error notification as shown in FIG. 11 is displayed on the operation panel 31, thereby the user grasps that an external device is performing a certain setting change and the image forming apparatus 10 is locked.

Then, in this state where the lock processing is performed, setting change is performed based on the setting change request from the terminal device 20 in the image forming apparatus 10 (step S505). Then, when the setting change has been completed, a setting change completion notification is transmitted from the image forming apparatus 10 to the terminal device 20 (step S506). Then, the terminal device 20 receives the setting change completion notification, checks that the designated setting change has been completed, and transmits a lock release instruction to the image forming apparatus 10 (step S507). Accordingly, in the image forming apparatus 10, the lock processing is released, and it is possible to receive a new setting change request (step S508).

Figure 12:
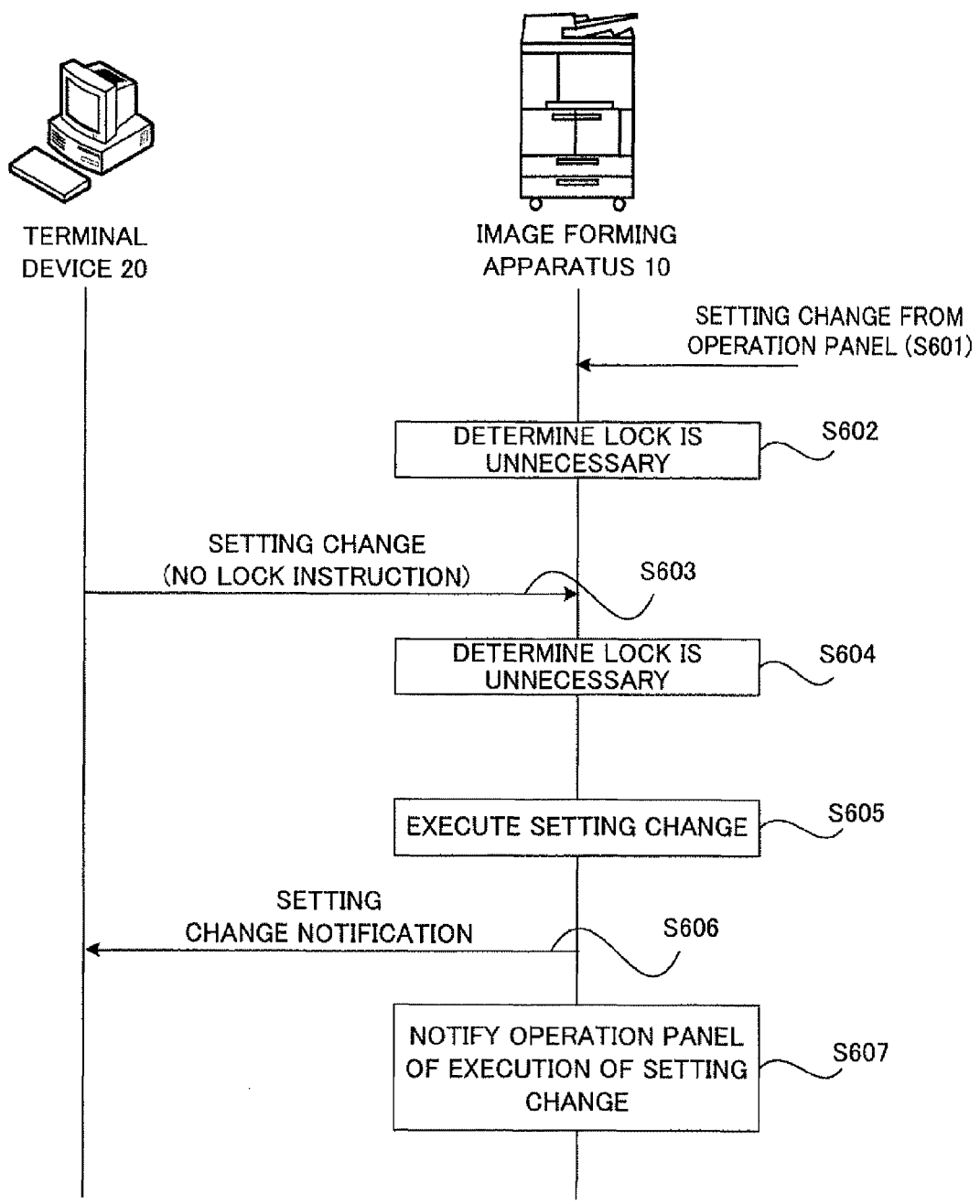
FIG. 12 is a sequence chart showing another example of the operation performed between the image forming apparatus 10 and the terminal device 20.

Further, another example of the operation performed between the image forming apparatus 10 and the terminal device 20 will be described with reference to the sequence chart of FIG. 12.

In the image forming apparatus 10, when a setting change request is inputted from the operation panel 31 (step S601) and the lock necessary/unnecessary determination part 35 in the image forming apparatus 10 determines that the lock processing is unnecessary to perform the setting change request (step S602), the lock processing is not performed.

Accordingly, in this state, when a setting change request without a lock instruction is transmitted from the terminal device 20 to the image forming apparatus 10 (step S603), the lock necessary/unnecessary determination part 35 in the image forming apparatus 10 determines whether or not the lock processing is necessary to perform the setting change request from the terminal device 20. When it is determined that the lock processing is unnecessary (step S604), setting change is performed based on the setting change request from the terminal device 20 in the image forming apparatus 10 (step S605). When the setting change has been completed, a setting change completion notification is transmitted from the image forming apparatus 10 to the terminal device 20 (step S66). Then, as shown in FIG. 13, a notification of execution of setting change by the terminal device 20 as an external device is displayed on the operation panel 31 (step S607).

Figure 13:
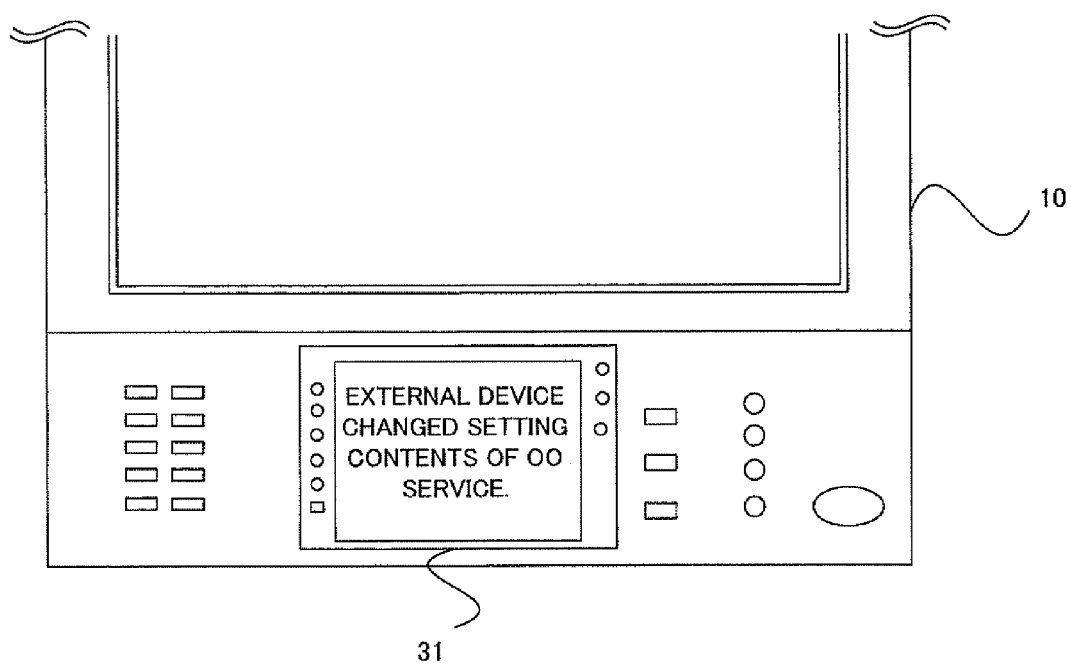
FIG. 13 illustrates an example of notification, displayed on the operation panel 31 of the image forming apparatus 10, of execution of setting change by an external device.

In the example shown in FIG. 13, a message "External device changed setting contents of OO service." is displayed, and the user who watches the operation panel 31 grasps that the setting contents of a particular service have been changed by an external device.

Figure 14:
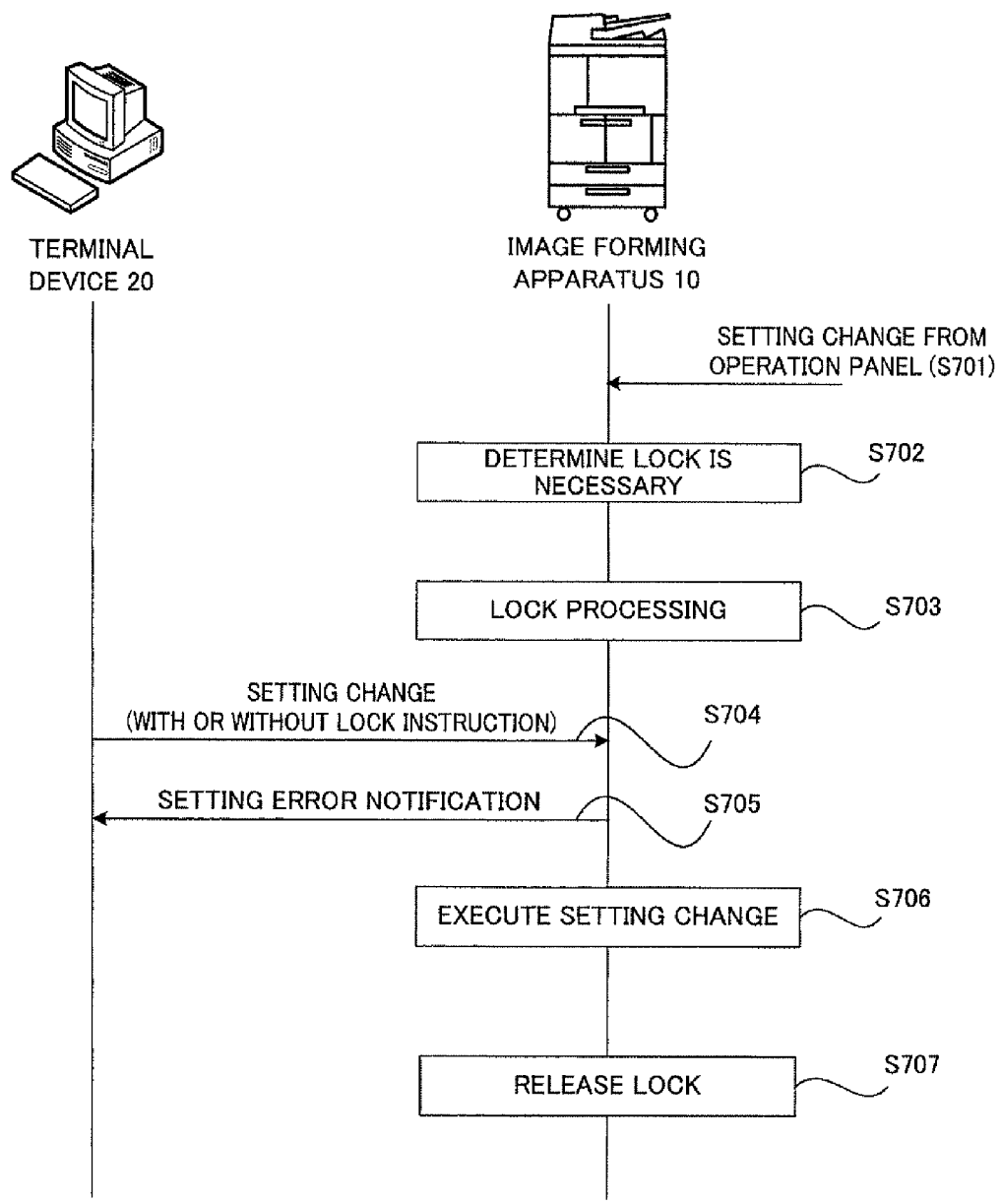
FIG. 14 is a sequence chart showing another example of the operation performed between the image forming apparatus 10 and the terminal device 20.

Further, another example of the operation performed between the image forming apparatus 10 and the terminal device 20 will be described with reference to the sequence chart of FIG. 14.

In the image forming apparatus 10, when a setting change request is inputted from the operation panel 31 (step S701)

and the lock necessary/unnecessary determination part 35 in the image forming apparatus 10 determines that the lock processing is necessary to perform the setting change request (step S702), the lock controller 36 performs the lock processing (step S703).

Figure 15:
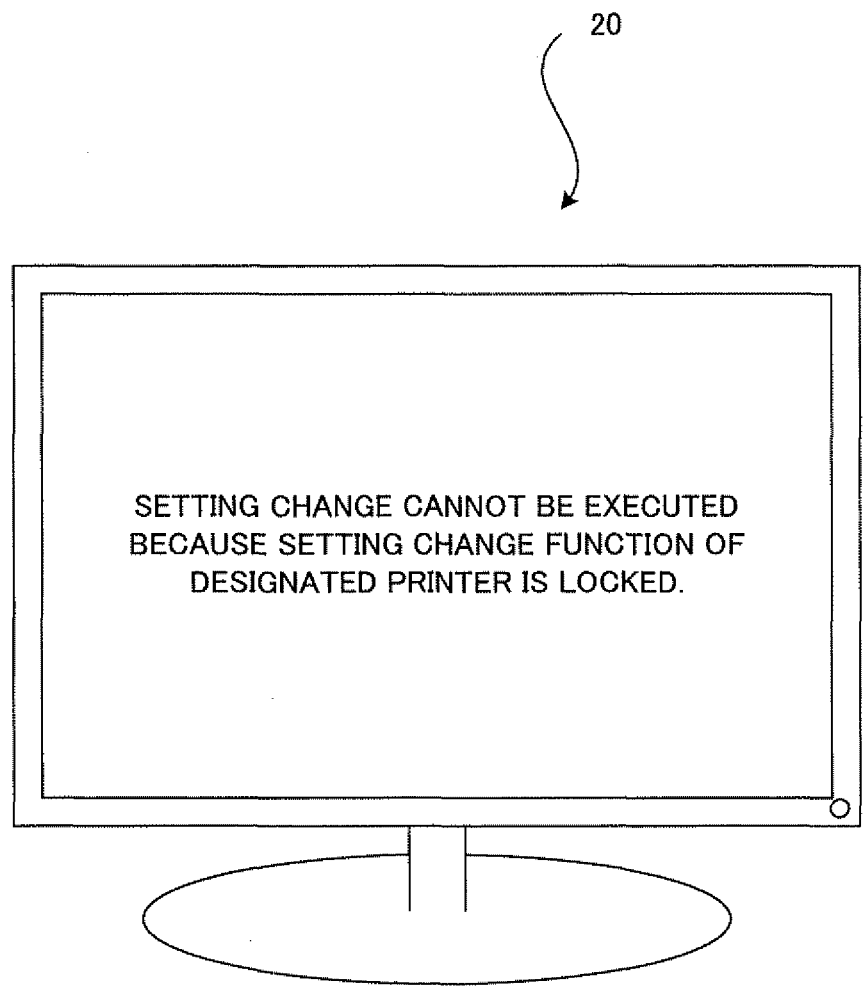
FIG. 15 illustrates another example of the error notification displayed in the terminal device 20.

In this state, when a setting change request without or with a lock instruction is transmitted from the terminal device 20 to the image forming apparatus 10 (step S704), the setting change request is not received and an error notification is returned to the terminal device 20 in any case (step S705). FIG. 15 shows an example where this error notification is displayed on the display screen of the terminal device 20.

In this example shown in FIG. 15, a message "Setting change cannot be executed because setting change function of designated printer is locked." is displayed, and the user of the terminal device 20 grasps that the setting change function of the image forming apparatus 10 is currently locked.

Then, in the image forming apparatus 10, setting change processing is performed based on the setting change request inputted from the operation panel 31 (step S706), and when the setting change has been completed, the lock state is released (step S707).

Note that in the present exemplary embodiment, whether or not a lock instruction is included in a setting change request transmitted from the terminal device 20 to the image forming apparatus 10 can be selected; however, it may be arranged such that when a setting change request is inputted from the operation panel 31, execution or non-execution of the lock processing is instructed regardless of lock necessary/unnecessary information.

[Modification]

In the above-described exemplary embodiment, although the present invention is applied to the image forming apparatus 10 which is a printer or the like, the present invention is not limited to this image forming apparatus. The present invention is applicable to any information processing apparatus as long as it has a communication unit for communication with an external device and performs user interface control to receive a setting change request from the external device.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a first change unit that changes a setting of a provided function based on a setting change request received from a first external device;
   a second change unit that changes a setting of a provided function based on a setting change request inputted from an operation part of the apparatus;
   a storage unit that stores necessity information indicating whether exclusive processing is necessary, the necessity information being set for each function respectively, the exclusive processing indicating:
      when the first change unit receives a setting change request from the first external device, the first change unit does not receive a setting change request from a second external device different from the first external device and the second change unit does not receive a setting change request from the operation part of the apparatus; and
      when the second change unit receives a setting change request from the operation part of the apparatus, the first change unit does not receive a setting change request from either the first external device or the second external device;
   a determination unit that determines whether exclusive processing is necessary based on the necessity information set for function of which the setting change is requested, the necessity information being stored in the storage unit; and
   a controller that, when the determination unit determines that the exclusive processing is necessary, controls the first change unit not to receive a setting change request from the second external device and the second change unit not to receive a setting change request from the operation part of the apparatus when the first change unit receives a setting change request from the first external device, and controls the first change unit not to receive a setting change request from either the first external device or the second external device when the second change receives a setting change request from the operation part of the apparatus, the exclusive processing being executed until the setting change request has been executed.

2. The information processing apparatus according to claim 1, wherein when the first change unit receives, from the first external device, a setting change request including an instruction to change a setting while rejecting a setting change request from the second external device and the operation part of the apparatus, the controller controls the first and second change units not to receive the setting change request from the second external device regardless of a result of determination by the determination unit.

3. The information processing apparatus according to claim 1, further comprising a transmission unit that, when the first change unit receives, from the first external device, a setting change request including an instruction to change a setting without rejecting a setting change request from the second external device and the operation part of the apparatus, and the determination unit determines that the exclusive processing is necessary, transmits a notification indicating that the exclusive processing is necessary to the first external device which has transmitted the setting change request.

4. The information processing apparatus according to claim 1, wherein when the first change unit receives, from the first external device, a setting change request including an instruction to change a setting without rejecting a setting change request from the second external device and the operation part of the apparatus, and the determination unit determines that the exclusive processing is unnecessary, the controller controls the first and second change units to perform setting change without controlling the first and second change units not to receive a setting change request from the second external device and the operation part of the apparatus.

5. The information processing apparatus according to claim 1, wherein when the second change unit receives a setting change request from the operation part of the apparatus and the determination unit determines that the exclusive processing is unnecessary, the controller controls the first and second change units to receive a setting change request from the second external device.

6. The information processing apparatus according to claim 1, further comprising a notification unit that, when a setting of a previously-set function is changed from the first external device, notifies the operation part of the apparatus of the change of the setting content of the function, and when a setting of a previously-set function is changed from the operation part of the apparatus, notifies the first external device of the change of the setting content of the function.

7. An image forming apparatus comprising:
- a first change unit that changes a setting of a provided function based on a setting change request received from a first external device;
- a second change unit that changes a setting of a provided function based on a setting change request inputted from an operation part of the apparatus;
- a storage unit that stores necessity information indicating whether exclusive processing is necessary, the necessity information being set for each function respectively, the exclusive processing indicating:
  - when the first change unit receives a setting change request from the first external device, the first change unit does not receive a setting change request from a second external device different from the first external device and the second change unit does not receive a setting change request from the operation part of the apparatus; and
  - when the second change unit receives a setting change request from the operation part of the apparatus, the first change unit does not receive a setting change request from either the first external device or the second external device;
- a determination unit that determines whether exclusive processing is necessary based on the necessity information set for function of which the setting change is requested, the necessity information being stored in the storage unit; and
- a controller that, when the determination unit determines that the exclusive processing is necessary, controls the first change unit not to receive a setting change request from the second external device and the second change unit not to receive a setting change request from the operation part of the apparatus when the first change unit receives a setting change request from the first external device, and controls the first change unit not to receive a setting change request from either the first external device or the second external device when the second change receives a setting change request from the operation part of the apparatus, the exclusive processing being executed until the setting change request has been executed; and
- an image output part that outputs an image based on image data designated from the first external device or the operation part of the apparatus.

8. A user interface control method comprising:
- receiving a setting change request received from a first external device or receiving a setting change request inputted from an operation part of an information processing apparatus;
- storing necessity information indicating whether exclusive processing is necessary, the necessity information being set for each function respectively, the exclusive processing indicating:
  - when a setting change request is received from the first external device, the exclusive processing indicates to not receive a setting change request from a second external device different from the first external device or from the operation part of the apparatus; and
  - when a setting change request is received from the operation part of the apparatus, the exclusive processing indicates to not receive a setting change request from either the first external device or the second external device;
- determining whether exclusive processing is necessary based on the necessity information set for function of which the setting change is requested;
- performing the exclusive processing when it is determined that the exclusive processing is necessary; and
- changing the setting based on the setting change request received from the first external device or the operation part of the apparatus.

9. A non-transitory computer readable medium storing a program causing a computer to execute a process for user interface control, the process comprising:
- receiving a setting change request received from a first external device or receiving a setting change request inputted from an operation part of an information processing apparatus;
- storing necessity information indicating whether exclusive processing is necessary, the necessity information being set for each function respectively, the exclusive processing indicating:
  - when a setting change request is received from the first external device, the exclusive processing indicates to not receive a setting change request from a second external device different from the first external device or from the operation part of the apparatus; and
  - when a setting change request is received from the operation part of the apparatus, the exclusive processing indicates to not receive a setting change request from either the first external device or the second external device;
- determining whether exclusive processing is necessary based on the necessity information set for function of which the setting change is requested;
- performing the exclusive processing when it is determined that the exclusive processing is necessary; and
- changing the setting based on the setting change request received from the first external device or the operation part of the apparatus.

* * * * *